United States Patent
Will et al.

(10) Patent No.: US 12,203,503 B2
(45) Date of Patent: Jan. 21, 2025

(54) ROLL STAND

(71) Applicant: SMS group GmbH, Düsseldorf (DE)

(72) Inventors: Roland Will, Wenden (DE); Andrej Tucak, Wenden-Brün (DE)

(73) Assignee: SMS group GmbH, Düsseldorf (DE)

(*) Notice: Subject to any disclaimer, the term of this patent is extended or adjusted under 35 U.S.C. 154(b) by 281 days.

(21) Appl. No.: 17/919,275

(22) PCT Filed: Apr. 9, 2021

(86) PCT No.: PCT/EP2021/059283
§ 371 (c)(1),
(2) Date: Oct. 16, 2022

(87) PCT Pub. No.: WO2021/209332
PCT Pub. Date: Oct. 21, 2021

(65) Prior Publication Data
US 2023/0228295 A1     Jul. 20, 2023

(30) Foreign Application Priority Data

Apr. 16, 2020   (DE) .................... 10 2020 204 818.5
Dec. 29, 2020   (DE) .................... 10 2020 216 586.6

(51) Int. Cl.
*F16C 32/06*        (2006.01)
*B21B 13/00*        (2006.01)

(52) U.S. Cl.
CPC .......... *F16C 32/0629* (2013.01); *B21B 13/00* (2013.01); *F16C 2322/12* (2013.01)

(58) Field of Classification Search
CPC ............. F16C 2322/12; F16C 32/0629; B21B 31/074; B21B 13/00; B21B 38/00
See application file for complete search history.

(56) References Cited

U.S. PATENT DOCUMENTS 3,934,678 A * 1/1976 Jennings ................. F01M 11/10
                                                                  184/108
4,944,609 A * 7/1990 Salter, Jr. ................. F16C 13/02
                                                                  384/118

(Continued)

FOREIGN PATENT DOCUMENTS

CN      107989914 A      5/2018
EP       1863603 A1     12/2007

(Continued)

OTHER PUBLICATIONS

Eaton, company brochure "Condition monitoring and analysis of hydraulic and lubrication fluids," 2016.

*Primary Examiner* — Michael R Mansen
*Assistant Examiner* — Mark K Buse
(74) *Attorney, Agent, or Firm* — Smartpat PLC

(57) ABSTRACT

A roll stand (1) includes a roll (3), in particular a backup roll, mounted via oil film bearings (2). Each oil film bearing (2) has a sealing system for sealing the oil film bearing (2) to prevent oil leakage and a coolant ingress. The oil film bearing (2) is integrated into an oil-circulating lubrication system (4), which is fluidically connected to the oil film bearing (2) via oil feed lines (5) and an oil discharge line (6). A first sensor (11) is arranged in the oil feed line (5) and a second sensor (12) is arranged in the oil discharge line (6). The two sensors (11, 12) are designed to determine the coolant content in the relevant oil volume flow.

16 Claims, 3 Drawing Sheets

(56) References Cited

U.S. PATENT DOCUMENTS

| | | | | |
|---|---|---|---|---|
| 6,463,796 | B1* | 10/2002 | Van Mullekom | F01M 11/04 73/114.55 |
| 2002/0183179 | A1* | 12/2002 | Pienmaki | D21G 1/0013 492/15 |
| 2006/0033291 | A1* | 2/2006 | Tones | F16C 13/02 277/562 |
| 2006/0180394 | A1* | 8/2006 | Wojtkowski | B21B 31/074 184/6.4 |
| 2014/0007657 | A1* | 1/2014 | Matsubara | G01N 27/221 73/53.05 |
| 2014/0248007 | A1* | 9/2014 | Corts | F16C 13/02 384/114 |
| 2015/0082871 | A1* | 3/2015 | Zha | G01N 33/2888 73/53.05 |
| 2016/0195133 | A1* | 7/2016 | Corts | B29C 43/006 264/269 |
| 2016/0236250 | A1* | 8/2016 | Johanson | B21B 31/078 |
| 2017/0211437 | A1* | 7/2017 | Amin | B60W 50/14 |
| 2024/0085272 | A1* | 3/2024 | Nobile | F16C 17/243 |

FOREIGN PATENT DOCUMENTS

| | | |
|---|---|---|
| EP | 2764263 B1 | 4/2013 |
| EP | 2682732 A1 | 1/2014 |
| JP | 2010112525 A | 5/2010 |

\* cited by examiner

ROLL STAND

TECHNICAL FIELD

The present disclosure relates to a roll stand, in particular for rolling a rolled material, a method for detecting contamination of an oil caused by a coolant and, if necessary, for localizing a source of interference in an oil film bearing of a roll stand, along with a method for detecting losses of an oil and, if necessary, for localizing a source of interference in an oil film bearing of a roll stand.

BACKGROUND

The effective and durable sealing of oil film bearings against the escape of lubricant and/or oil as well as against the ingress of roll coolant is of great importance for economical operations, the strip quality of the rolled material and, above all, for reasons of environmental protection. However, due to the harsh operating conditions, this is not always guaranteed, such that in the event of a failure, additional expenses for unscheduled roll changes can arise.

From the prior art, only monitoring and alarm systems that perform an evaluation based on temperature, pressure and volume flow data to ensure safe operation are known. With the monitoring and alarm system known from EP 1 863 603 A1, a lubricant is pumped from a reservoir via feed lines and feed branch lines to the various oil film bearings and then returned from the oil film bearings to the reservoir via discharge branch lines and return lines. The system comprises a plurality of sensors by means of which the volume flow and the temperature of the lubricant are determined in the feed and discharge branch lines and evaluated by means of an evaluation device.

SUMMARY

The present disclosure is based on the object of further improving a roll stand and a method to enable the early detection of contamination of an oil and/or lubricant caused by a coolant and/or of losses of an oil and/or lubricant and, if necessary, the localizing of a source of interference in an oil film bearing of a roll stand.

This object is achieved by a roll stand and a method as described and claimed.

In a first aspect, the present disclosure relates to a roll stand, in particular for rolling a rolled material, comprising a roll, in particular a backup roll, mounted via oil film bearings, wherein the oil film bearing has a sealing system for sealing the oil film bearing to prevent oil leakage and a coolant ingress, and is integrated into an oil-circulating lubrication system, which is fluidically connected to the oil film bearing via oil feed lines and an oil discharge line.

The roll stand comprises a first sensor arranged in the oil feed line and a second sensor arranged in the oil discharge line, wherein the two sensors are designed to determine the coolant content in the relevant oil volume flow.

In a similar manner, the disclosure provides a method for detecting impurities in an oil caused by a coolant and, if necessary, for localizing a source of interference in an oil film bearing of a roll stand, wherein the oil film bearing has a sealing system for sealing the oil film bearing to prevent oil leakage and a coolant ingress, and is integrated in an oil-circulating lubrication system, which is fluidically connected to the oil film bearing via oil feed lines and an oil discharge line, wherein the coolant content in the relevant oil volume flow is determined by means of a first sensor arranged in the oil feed line and a second sensor arranged in the oil discharge line, and is preferably transmitted to an evaluation device and evaluated by it.

In a further aspect, the present disclosure also relates to a method for detecting losses of an oil and, if necessary, for localizing a source of interference in an oil film bearing of a roll stand, wherein the oil film bearing has a sealing system for sealing the oil film bearing to prevent oil leakage and a coolant ingress, and is integrated into an oil-circulating lubrication system, which comprises a storage tank with a fill level sensor and which is fluidically connected to the oil film bearing via oil feed lines and an oil discharge line, wherein the coolant content in the relevant oil volume flow is determined by means of a first sensor arranged in the oil feed line and a second sensor arranged in the oil discharge line, and is preferably transmitted to an evaluation device and evaluated by it.

The present disclosure is based on the finding that by continuous detection and comparison of coolant contents in the oil or lubricant, as the case may be, both downstream and upstream of the oil film bearing, oil contamination by the coolant, such as water ingress, can be directly detected and, if necessary, localized. Furthermore, losses of oil or lubricant, as the case may be, can be reliably determined by continuously monitoring and evaluating the fill level of the storage tank and taking into account the previously determined lubricant contamination.

Preferably, the roll stand comprises an evaluation device for this purpose, by means of which the determined information can be evaluated.

Based on the measurement data, predefined maintenance measures can then be obtained, such that demand-oriented and targeted maintenance can be carried out. This not only reduces maintenance and operating costs, including time-consuming and cost-intensive laboratory analyses, but also reduces the burden on the environment.

Further advantageous embodiments are indicated in the dependent claims. The features listed individually in the dependent claims can be combined with one another in a technologically useful manner and can define further embodiments of the invention. In addition, the features indicated in the claims are further specified and explained in the description, wherein further preferred embodiments are illustrated.

In principle, the measurement of impurities caused by the coolant, such as water ingress, can be carried out directly. However, for economic reasons, indirect measurement is preferred. Therefore, preferably the first and/or the second sensor is designed in the form of a viscosity sensor, a conductivity sensor, an optical sensor and/or a density sensor, by means of which the contamination of the oil can then be indirectly detected.

As a result of material wear, axial misalignments occur over time, which until now could only be reconstructed by removing and inspecting the individual components. To localize the cause of the fault, an advantageous embodiment therefore provides that the roll stand comprises at least one, preferably inductive, distance sensor, by means of which the axial distance between a reference surface on the roll body side of a chock, preferably an annular channel connected to the chock, and an end surface of a roll body, preferably a deflector ring connected to the roll body, arranged axially opposite the chock, can be determined. Advantageously, the information can then be transmitted to an evaluation device and evaluated by it. This enables online monitoring of the axial positioning of the roll, in particular a backup roll, and a bearing housing during rolling operation.

In a further advantageous embodiment, in order to localize the cause of the fault, it is provided that the roll stand comprises at least one third sensor arranged within the sealing system of the oil film bearing, which sensor is particularly preferably arranged between a seal on the oil side and a seal on the coolant side. The third sensor can also be used to determine the coolant content and/or oil or lubricant content, as the case may be, in this region. This sensor can also be in the form of a viscosity sensor, a conductivity sensor, an optical sensor and/or a density sensor. Thereby, it is particularly preferred that the third sensor is arranged between two lips of a high-performance journal seal, between two shaft sealing rings, between a seal with two sealing lips, and/or a seal and a labyrinth that seals the oil film bearing with respect to the coolant. In particular, the third sensor is preferably localized at the lowest point of the sealing system, in a so-called six o'clock position.

Since an excessively high volume of oil or lubricant, as the case may be, inside the oil film bearing can cause a leak, a further advantageous embodiment for localizing the cause of the fault is that the fill level of the oil in the oil sump can be determined by means of a fill level sensor arranged inside the oil film bearing, preferably transmitted to the evaluation device and then also evaluated by it.

Furthermore, in order to identify at an early stage unacceptably high wear inside the oil film bearing on at least one of the elements of the bearing selected from the group comprising a journal bushing, a pressure shoulder ring, a thrust bearing unit and/or a thrust bearing housing, and if necessary to obtain a repair indication for an imminent bearing overall, the roll stand advantageously comprises on at least one, more preferably on each of the elements, a measuring device by means of which the wear on the axial contact surfaces of the specified elements relative to one another can be detected. The measuring device can, for example, take the form of a sensor that is known and marketed by the patent holder under the product name "Mold Tracker."

Furthermore, the system can comprise a measuring device in the coupling region of the oil feed line and/or the oil discharge line, by means of which the correct coupling connection can be detected in order to monitor it. Particularly when using an automatic media coupling, for example, the coupling connection can be effectively monitored via an electrical contactor in order to identify the oil losses locally.

The invention and the technical environment are explained in more detail below with reference to the figures. It should be noted that the invention is not intended to be limited by the exemplary embodiments shown. In particular, unless explicitly shown otherwise, it is also possible to extract partial aspects of the facts explained in the figures and combine them with other components and findings from the present description and/or figures. In particular, it should be noted that the figures and in particular the size relationships shown are only schematically. Identical reference signs designate identical objects, such that explanations from other figures can be used as a supplement if necessary.

DETAILED DESCRIPTION

Figure 1:
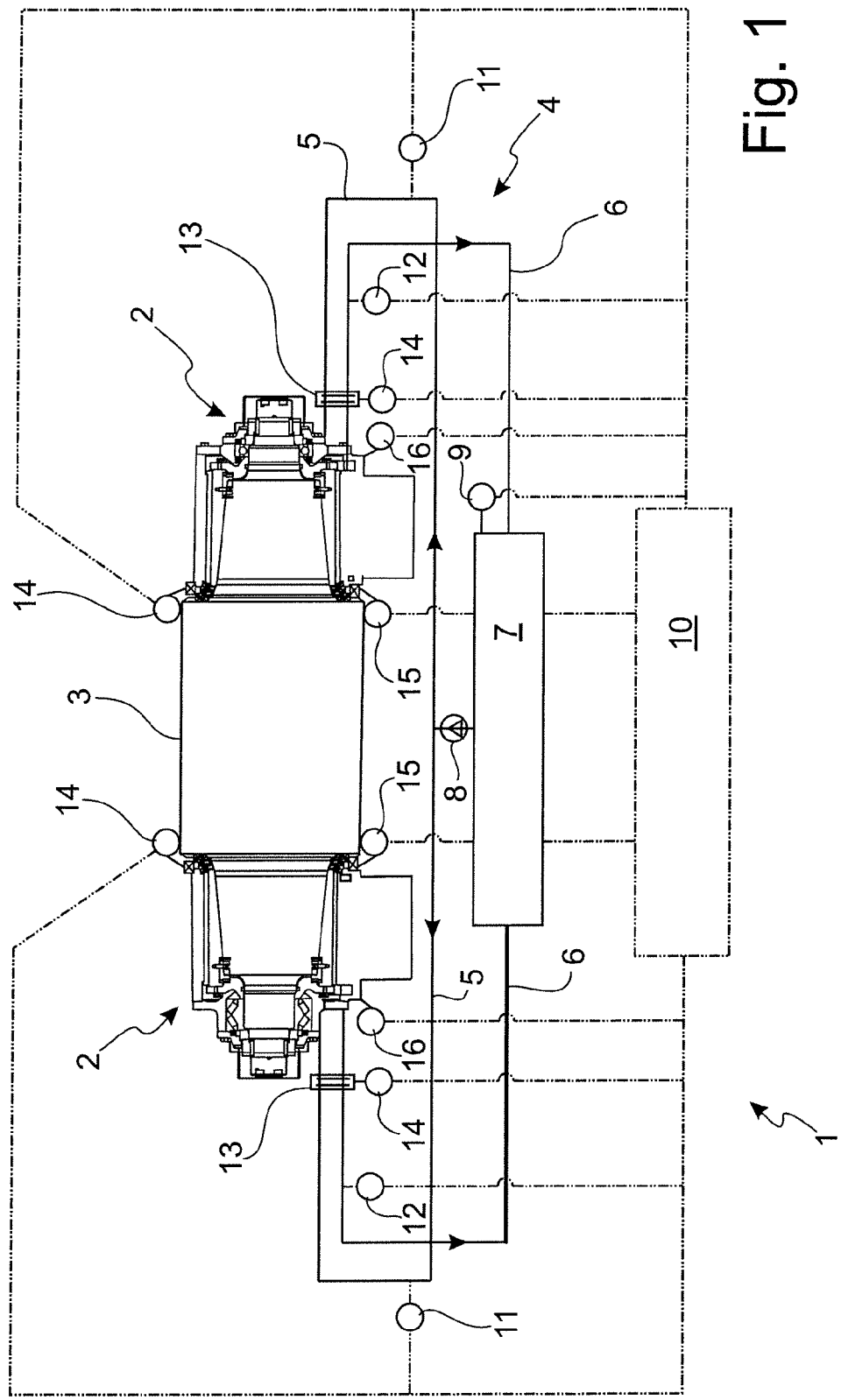
FIG. 1 shows an embodiment of the roll stand.

FIG. 1 shows an embodiment of the roll stand 1, which has a backup roll 3 supported by oil film bearings 2. Both oil film bearings 2 each have a sealing system for sealing the oil film bearing 2 to prevent oil leakage and a coolant ingress and are integrated into an oil-circulating lubrication system 4. The oil-circulating lubrication system 4 is fluidically connected to the two oil film bearings 2 via oil feed lines 5 and an oil discharge line 6 and also has a storage tank 7, a pump 8 and other units not shown here, such as a filter, an oil cooler and a control station. Thus, the oil can be fed to the relevant oil film bearing 2 by means of the pump 8 via the relevant feed lines 5 and discharged again via discharge lines 6. In order to be able to determine the fill level of the oil in the storage tank 7, the latter comprises a fill level sensor 9, which is connected by means of signals to an evaluation device 10 and continuously transmits the fill levels to the latter.

The roll stand 1 has a first sensor 11 arranged in the oil feed line 5 and a second sensor 12 arranged in the oil discharge line 6, by means of which the coolant content in the relevant oil volume flow can be determined. As shown in FIG. 1, both sensors 11, 12 are also connected to the evaluation unit 10 by means of signals, such that the information determined can be transmitted to it and evaluated by it. Both sensors 11, 12 are designed in the form of a viscosity sensor. Alternatively, the two sensors 11, 12 may be in the form of conductivity sensors, in the form of optical sensors or in the form of density sensors.

Furthermore, the oil feed line 5 and the oil discharge line 6 in the embodiment shown here comprise a measuring device 14 arranged in the coupling region 13, by means of which the coupling connections can be detected. The measuring devices 14, which are designed as electrical contactors, are also connected to the evaluation device 10 by means of signals.

As already explained, by continuously detecting and comparing coolant contents in the oil downstream and upstream of the oil film bearing 2, oil contamination by the coolant, such as water ingress, can be directly detected and, if necessary, localized. By continuously monitoring and evaluating the fill level of the storage tank 7 and taking into account the previously determined oil contamination, losses of oil can also be reliably determined. To localize the source of interference, the roll stand 1 shown in FIG. 1 comprises further sensors 14, 15, 16, whose position is indicated in FIG. 1 and whose function is explained in more detail in FIGS. 2 and 3 below. As shown in FIG. 1, such sensors 14, 15, 16 are also connected to the evaluation device 10 by means of signals.

Figure 2:
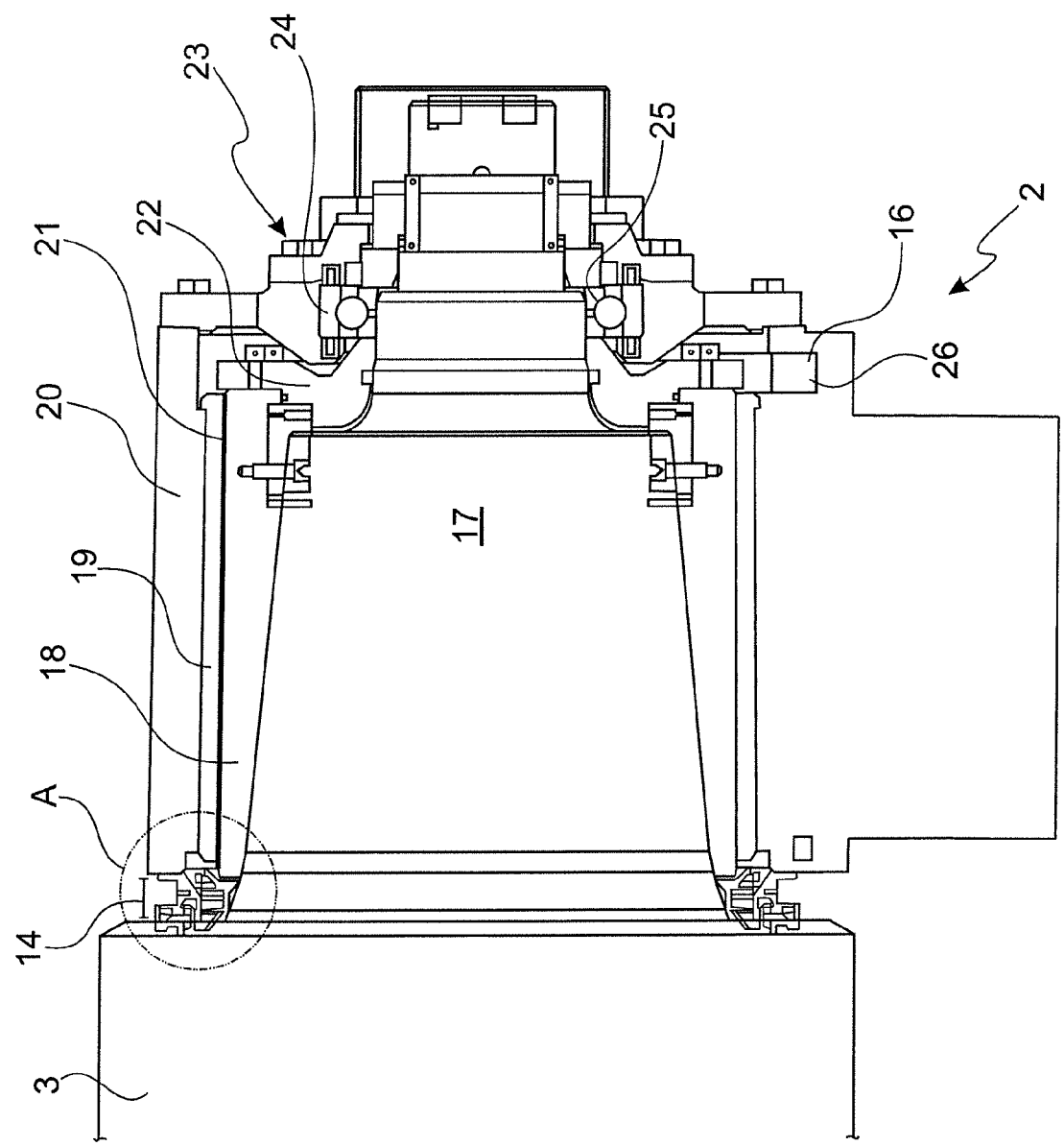
FIG. 2 shows a sectional view of an oil film bearing with a backup roll.

FIG. 2 shows a sectional view of one of the two oil film bearings 2, in which the backup roll 3 is mounted via its conically formed roll journal 17. In the embodiment shown here, the oil film bearing 2 comprises a conically formed journal bushing 18, which is rotatably mounted in a bearing bushing 19, wherein the bearing bushing 19 in turn is enclosed by a chock 20. A lubricating film 21 is typically formed in the load zone between the stationary bearing bushing 19 and the journal bushing 18, which rotates together with the roll journal 17 during rolling operation.

In the embodiment presently shown, the oil film bearing 2 is further connected to a thrust bearing unit 23 via a pressure shoulder ring 22, which comprises a thrust bearing housing 24 and a thrust bearing 25.

As also shown in FIG. 2, the roll stand 1 has a further fill level sensor 16 arranged inside the oil film bearing 2, by means of which the fill level 26 of the oil in the lubricant sump can be determined.

Figure 3:
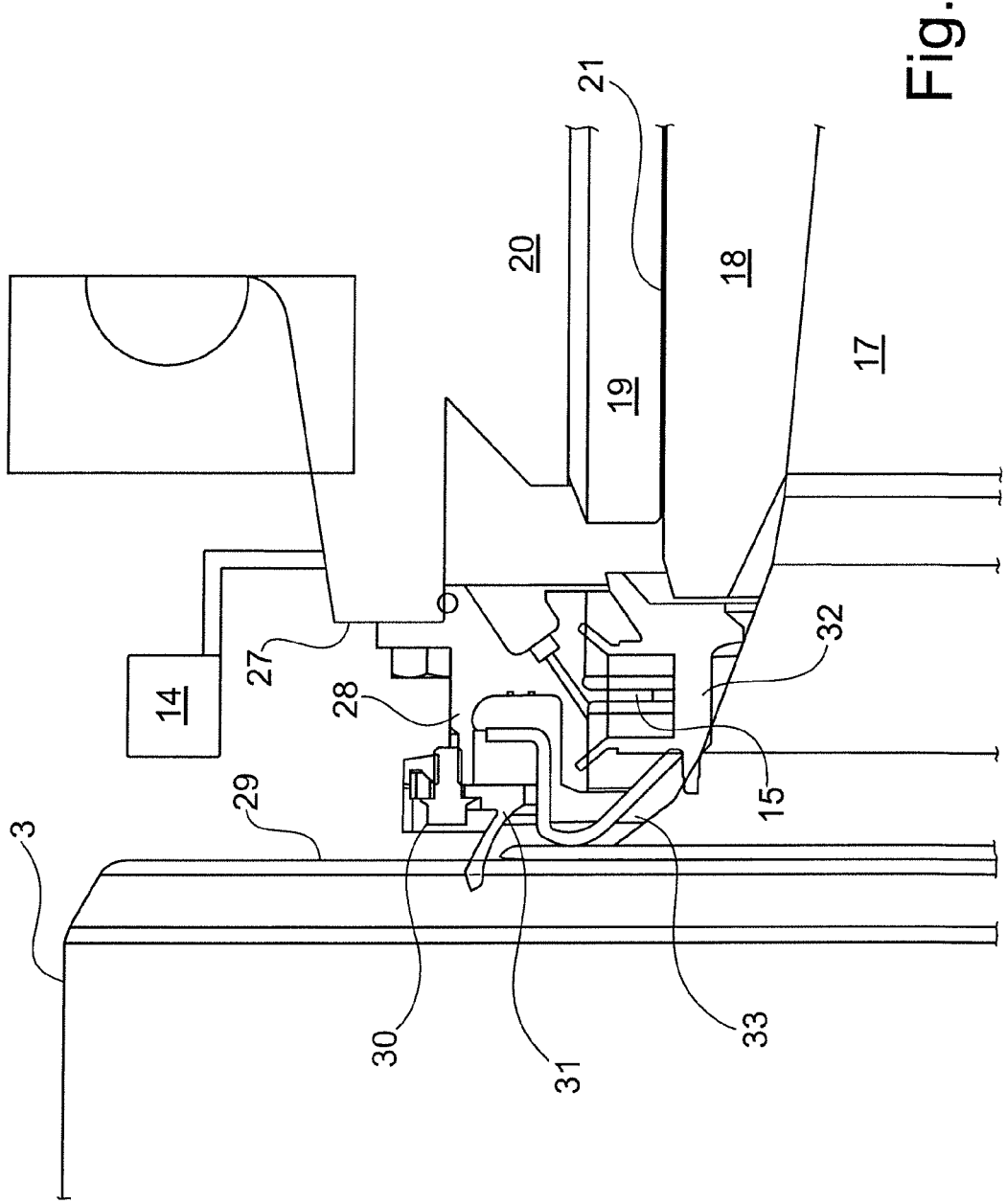
FIG. 3 shows an enlarged illustration of the region A marked in FIG. 2.

FIG. 3 shows the region A marked in FIG. 2 in an enlarged view.

What can be seen in this illustration is, on the one hand, the distance sensor 14, which is firmly connected to the chock 20 and by means of which the axial distance between a reference surface 27 of the chock 20 on the roll body side, in particular of an annular channel 28 connected to the chock 20, and the end surface 29 of the roll body of the backup roll 3, in particular of a deflector ring 30 connected to the roll body, arranged axially opposite the chock 20, can be determined. The oil film bearing 2 is sealed off from the coolant at this point by a sealing lip 31 arranged between the annular channel 28 and the deflector ring 30. The position of the sealing lip 31 relative to the associated counter surface can then be continuously monitored by measuring the axial distance.

In the present embodiment, the oil film bearing 2 further comprises a high-performance journal seal 32 arranged between an inner annular surface 33 of the annular channel 28 and the roll journal 17 and seals the oil film bearing 2 from a coolant ingress and an oil outlet. In order to detect any exchange of media between the oil side and the coolant side, the oil film bearing 2 has the third sensor 15, which is advantageously arranged between the sealing lip on the oil side and the coolant side at the lowest point of the sealing system, preferably in a so-called 6 o'clock position. The third sensor 15 can be in the form of a viscosity sensor, an optical sensor, a conductivity sensor and/or a density sensor.

LIST OF REFERENCE SIGNS

1 Roll stand
2 Oil film bearing
3 Backup roll
4 Oil-circulating lubrication system
5 Feed line
6 Discharge line
7 Storage tank
8 Pump
9 Fill level sensor
10 Evaluation device
11 First sensor
12 Second sensor
13 Coupling region
14 Distance sensor
15 Third sensor
16 (Second) fill level sensor
17 Roll journal
18 Journal bushing
19 Bearing bush
20 Chock
21 Lubricating film
22 Pressure shoulder ring
23 Thrust bearing unit
24 Thrust bearing housing
25 Thrust bearing
26 Fill level of the oil
27 Reference surface
28 Annular channel
29 End surface
30 Deflector ring
31 Sealing lip
32 High-performance journal seal
33 Inner annular surface

The invention claimed is:

1. A roll stand (1), comprising:
    a roll (3);
    an oil film bearing (2) by which the roll (3) is mounted, the oil film bearing (2) comprising a sealing system for sealing the oil film bearing (2) to prevent oil leakage and coolant ingress;
    an oil-circulating lubrication system (4) fluidically connected to the oil film bearing (2) via an oil feed line (5) and an oil discharge line (6);
    a first sensor (11) arranged in the oil feed line (5) and designed to determine a coolant content in an oil volume flow in the oil feed line (5); and
    a second sensor (12) arranged in the oil discharge line (6) and designed to determine a coolant content in an oil volume flow in the oil discharge line (6).

2. The roll stand (1) according to claim 1,
    wherein the roll (3) is a backup roll.

3. The roll stand (1) according to claim 1,
    wherein the first sensor (11) and/or the second sensor (12) is a viscosity sensor, a conductivity sensor, an optical sensor, and/or a density sensor.

4. The roll stand (1) according to claim 1,
    wherein the oil-circulating lubrication system (4) comprises a storage tank (7) with a fill level sensor (9),
    wherein the oil feed line (5) fluidically connects the storage tank (7) to the oil film bearing (2), and
    wherein the oil discharge line (6) fluidically connects the oil film bearing (2) to the storage tank (7).

5. The roll stand (1) according to claim 1, further comprising
    a distance sensor (14), by which an axial distance between a reference surface on a roll body side (27) of a chock (20) and an end surface (29) of a roll body arranged axially opposite the chock (20) can be determined.

6. The roll stand (1) according to claim 1, further comprising
    a distance sensor (14), by which an axial distance between an annular channel (28) connected to a chock (20) and a deflector ring (30) connected to a roll body arranged axially opposite the chock (20) can be determined.

7. The roll stand (1) according to claim 1, further comprising
    a third sensor (15) arranged within the sealing system.

8. The roll stand (1) according to claim 1, further comprising
    a third sensor (15) arranged in the oil film bearing (2) between an oil-side seal and a coolant-side seal.

9. The roll stand (1) according to claim 1, further comprising
    a fill level sensor (16) arranged inside the oil film bearing (2), by which a fill level of oil in an oil sump can be determined.

10. The roll stand (1) according to claim 1,
    wherein the oil film bearing (2) comprises a measuring device by which a condition of at least one element selected from the group consisting of a journal bushing (18), a pressure shoulder ring (22), a thrust bearing unit (23), and a thrust bearing housing (24) can be determined inside the oil film bearing (2).

11. The roll stand (1) according to claim 1, further comprising
    a measuring device arranged in a coupling region (13) of the oil feed line (5) and/or the oil discharge line (6), by which a leak in a coupling connection between the oil film bearing (2) and the oil feed line (5) and/or between the oil film bearing (2) and the oil discharge line (6) can be detected.

12. The roll stand (1) according to claim 1, further comprising
 an evaluation device (10) operatively connected to the first sensor (11) and the second sensor (12),
 wherein the evaluation device (10) is configured to continuously compare the coolant content in the oil volume flow in the oil feed line with the coolant content in the oil volume flow in the oil discharge line.

13. A method for detecting contamination of an oil caused by a coolant in an oil film bearing (2) of a roll stand (1),
 wherein the oil film bearing (2) comprises a sealing system for sealing the oil film bearing (2) to prevent oil leakage and coolant ingress and
 wherein an oil-circulating lubrication system (4) fluidically connects the oil film bearing (2) via an oil feed line (5) and an oil discharge line (6),
 the method comprising:
 determining, by a first sensor (11) arranged in the oil feed line (5), a coolant content in an oil volume flow in the oil feed line (5); and
 determining, by a second sensor (12) arranged in the oil discharge line (6), a coolant content in an oil volume flow in the oil discharge line (6).

14. The method as in claim 13, further comprising:
 determining, by a third sensor arranged within a sealing system of the oil film bearing between a seal on an oil side and a seal on a coolant side, a coolant content in oil in the sealing system, and
 localizing a fault of the sealing system.

15. The method as in claim 13, further comprising:
 continuously comparing the coolant content in the oil volume flow in the oil feed line with the coolant content in the oil volume flow in the oil discharge line.

16. A method for detecting losses of an oil in an oil film bearing (2) of a roll stand (1),
 wherein the oil film bearing (2) comprises a sealing system for sealing the oil film bearing (2) to prevent oil leakage and coolant ingress and
 wherein the oil film bearing (2) is integrated into an oil-circulating lubrication system (4),
 which comprises a storage tank (7) with a fill level sensor (9) and
 which is fluidically connected to the oil film bearing (2) via an oil feed line (5) and an oil discharge line (6),
 the method comprising:
 determining, by a first sensor (11) arranged in the oil feed line (5), a coolant content in an oil volume flow in the oil feed line (5); and
 determining, by a second sensor (12) arranged in the oil discharge line (6), a coolant content in an oil volume flow in the oil discharge line (6).

* * * * *